July 1, 1952  W. A. RICHMAN  2,601,994
STABILIZER FOR BICYCLES
Filed March 11, 1950
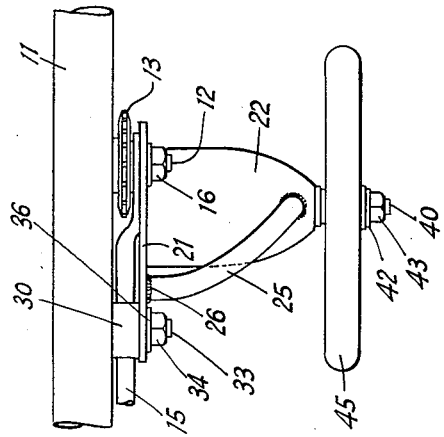
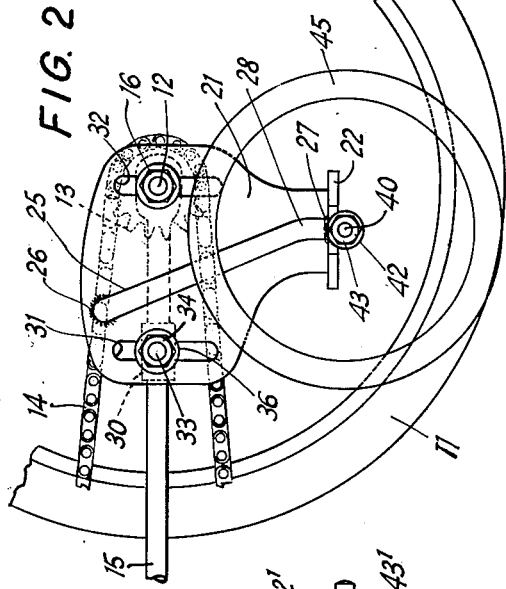
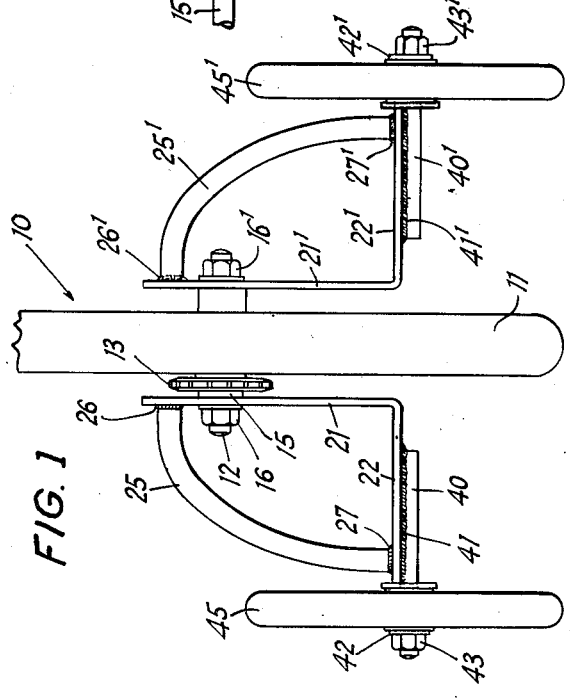
INVENTOR
WILLIAM A. RICHMAN
BY
*Alfred E. Page*
ATTORNEY Patented July 1, 1952

2,601,994

UNITED STATES PATENT OFFICE 2,601,994

STABILIZER FOR BICYCLES

William A. Richman, Brooklyn, N. Y., assignor to Stelber Cycle Corp., Brooklyn, N. Y., a corporation of New York Application March 11, 1950, Serial No. 149,042

4 Claims. (Cl. 280—304)

This invention relates to bicycles and, more particularly, to stabilizers arranged for securement to a bicycle and carrying wheels spaced laterally from the main wheels of the bicycle for engagement with the ground or other surface to prevent or limit tipping of the bicycle.

Such stabilizers are used most commonly with sidewalk bicycles or junior size bicycles and serve, in effect, to convert the bicycle into a tricycle while the user is learning to ride the bicycle. For example, one stabilizer or a pair of stabilizers may be initially secured to the bicycle in such manner that the stabilizer wheel or wheels are continually in contact with the ground. As the rider gains confidence and skill in using the bicycle, the stabilizers are adjusted so as to contact the ground only after a predetermined tipping of the bicycle. Finally, when the rider has learned to fully command the bicycle, the stabilizers are removed entirely.

The stabilizers hitherto proposed, and sometimes used, have not been satisfactory. Either they are complicated or expensive in construction and operation, or they are not sufficiently strong and do not have the requisite easy adjustability. Desirably, such stabilizers should be simple, sturdy, and easily applied to and adjusted on the bicycle, and, in addition, should be so designed as to appear to be an integrated part of the bicycle. This last is particularly important from the standpoint of commercial success.

The present invention is directed to a stabilizer which possesses all of the foregoing advantages, and is simple and inexpensive in construction. To this end, the stabilizer comprises a right angle bracket having a normally vertical wall and a normally horizontal wall, and may be made by bending a suitably shaped plate at right angles or by welding or brazing two plates arranged normal to each other. The two walls are interconnected by a brace comprising a tubular or solid bar, of circular cross section, which is longitudinally curved. One end of the bar is brazed or welded to the upper portion of the vertical wall near the forward edge thereof. The other end of the brace is welded or brazed to the horizontal plate near the outer edge thereof. When the stabilizer, or a pair thereof, are mounted on a bicycle, the braces have the appearance of the usual arched brace extending across the rear axle of a tricycle, thus giving the stabilizers the appearance of being an integrated part of the bicycle.

The vertical wall has a pair of longitudinally spaced, vertically extending slots. One of these slots receives the rear axle of the bicycle and the other receives a bolt or stud on a clamp secured to a horizontal member of the bicycle frame. These slots permit ready vertical adjustment of the stabilizer relative to the bicycle to predetermine the degree of permissible tilting of the bicycle.

Such tilting is limited by a small diameter bicycle or tricycle wheel secured on the outer end of an axle welded or brazed to the under surface of the horizontal plate and projecting laterally therebeyond.

With the foregoing in mind, it is an object of the present invention to provide a novel stabilizer for bicycles.

Another object is to provide such a stabilizer which is simple in construction, inexpensive, sturdy, easily adjustable, and has the appearance of being integrated with the bicycle to which it is attached.

These, and other objects, advantages and novel features of the invention will be apparent from the following description and the accompanying drawing. In the drawing:

Fig. 1 is a rear elevation view of a bicycle equipped with a pair of the invention stabilizers.

Fig. 2 is a partial side elevation view of the bicycle, illustrating the adjustable mounting of the stabilizer.

Fig. 3 is a partial plan view corresponding to Fig. 3.

In the drawing, the stabilizer 20 or 20' of the invention is illustrated as applied to a bicycle 10 shown incompletely as comprising a rear wheel 11, rear axle 12, driven sprocket 13, drive chain 14, and horizontal rear frame member 15, the frame member 15 being secured to axle 12 by the usual nuts 16, 16'. Only so much of bicycle 10 is shown as is necessary for a comprehensive understanding of how the stabilizer is secured to the bicycle, it being understood that bicycle 10 is of conventional construction.

As the left and right stabilizers 20 and 20', respectively, are mirror copies of each other, only left stabilizer 20 will be described in detail, the same reference characters, primed, being used to designate identical elements of right stabilizer 20'. Thus, stabilizer 20 includes a bracket having a vertical wall 21 and a horizontal wall 22, these walls being formed by bending a single piece of metal. Walls 21, 22 may be formed by welding or brazing a joint between two plates positioned at right angles to each other.

The walls are interconnected and braced by a bar 25 of circular cross section, and which may be tubular or a solid round. Bar 25 is compound curved, as will be noted from the three figures of the drawing and, as viewed from the front or rear of bicycle 10, has a transversely arched contour. The upper end of bar 25 is secured to wall 21, near the upper and forward edges thereof, by welding or brazing as indicated at 26. The lower end of bar 25 is secured to wall 22, near the outer end thereof, by a welded or brazed joint 27, bar 25 being bent to have a vertical section 28 for this purpose. It will be noted, particularly from Figs. 1 and 3, that the braces or bars 25, 25' give the rear end of the bicycle the appearance of a tricycle, the braces simulating the customary transversely arched, rear brace used in tricycle constructions. This gives the stabilizers 20, 20' the appearance of being integrated with bicycle 10.

Vertical wall 21 has a pair of longitudinally spaced, vertically extending slots 31, 32 therein. Slot 31 is arranged to receive a stud or bolt 33 projecting from a bracket 30 secured to frame member 15, a nut 34 and washer 36 being provided to secure wall 21 to bracket 30. Slot 32 receives rear axle 12 of bicycle 11, the usual axle nut 16 being used as a securing means. By virtue of slots 31, 32, stabilizer 20 is vertically adjustable relative to the bicycle frame.

Horizontal wall 22 has an axle 40 welded or brazed to its under surface as at 41, and axle 40 projects outwardly beyond wall 22, parallel to axle 12, to receive a smaller diameter wheel 45 held in place by washer 42 and nut 43.

In operation, stabilizer 20 is secured in position by removing nuts 16 and 34 and inserting axle 12 in slot 32 and stud 33 in slot 31, the nuts being then replaced and tightened to hold the stabilizer in position. Vertical adjustment of the stabilizer is effected by loosening nuts 13 and 34. The stabilizer may be set at any desired position to prevent or control tipping of the bicycle through engagement of wheel 45 with the ground. The brace bar 25 absorbs any stresses imposed on the stabilizer.

While a specific embodiment of the invention has been shown and described in detail to illustrate the application of the invention principles, it should be understood that the invention may be otherwise embodied without departing from such principles.

What is claimed is:
1. A stabilizer for a bicycle comprising a bracket including a vertical plate wall, a plate wall extending horizontally from the lower edge of said vertical wall, said vertical wall being formed with a slot to receive the rear axle of the bicycle, means on said vertical wall for engaging a horizontal frame member of the bicycle whereby the bracket may be positioned vertically of the bicycle frame, an axle mounted on the horizontal wall and extending outwardly thereof, a wheel mounted on the axle, and a rigid brace comprising an elongated member having one end thereof secured to the outer edge of said vertical wall adjacent the forward edge thereof and the other end thereof secured to the outer edge of the horizontal wall intermediate the front and rear edges thereof.

2. A bicycle stabilizer as claimed in claim 1 in which said bracket comprises an elongated flat plate bent to form said walls.

3. A bicycle stabilizer as in claim 1, wherein said vertical plate wall includes a front vertical edge disposed forwardly of the front horizontal edge of said horizontal plate wall, said elongated member having said one end located adjacent said front vertical edge on said first mentioned plate wall and further including a compound curved portion intermediate the ends thereof.

4. A bicycle stabilizer comprising a bracket having a pair of interconnected flat walls disposed at right angles to each other, one of said walls being dsposed in a vertical plane and including slot means for mounting said bracket on a rear wheel axle and means for engaging frame portions of a bicycle, the other of said walls being disposed in a horizontal plane and having an axle and wheel mounted thereon, a brace member integrally connecting said walls, said brace member comprising a bar connected at one end to said vertical wall at the top edge thereof and forwardly of the slot therein and connected at the other end thereof to the outer edge of said horizontal wall intermediate the front and rear edges thereof.

WILLIAM A. RICHMAN.

REFERENCES CITED

The following references are of record in the file of this patent:

UNITED STATES PATENTS

| Number | Name | Date |
| --- | --- | --- |
| 661,145 | Hausmann | Nov. 6, 1900 |
| 1,370,453 | Kilgour | Mar. 1, 1921 |
| 2,373,412 | Plecki | Apr. 10, 1945 |
| 2,450,979 | Moller | Oct. 12, 1948 |
| 2,527,431 | Kutil | Oct. 24, 1950 |

FOREIGN PATENTS

| Number | Country | Date |
| --- | --- | --- |
| 689,864 | France | June 3, 1930 |